US008691721B2

(12) United States Patent
Chiba et al.

(10) Patent No.: US 8,691,721 B2
(45) Date of Patent: Apr. 8, 2014

(54) RHODIUM-LOADING SOLUTION AND RHODIUM CATALYST PREPARED USING THE SAME

(75) Inventors: Akiya Chiba, Kakegawa (JP); Motoya Abe, Kakegawa (JP); Isao Naito, Kakegawa (JP)

(73) Assignee: Cataler Corporation, Kakegawa-shi, Shizuoka (JP)

( * ) Notice: Subject to any disclaimer, the term of this patent is extended or adjusted under 35 U.S.C. 154(b) by 339 days.

(21) Appl. No.: 12/443,340

(22) PCT Filed: Sep. 27, 2007

(86) PCT No.: PCT/JP2007/069415
§ 371 (c)(1),
(2), (4) Date: Mar. 27, 2009

(87) PCT Pub. No.: WO2008/038834
PCT Pub. Date: Apr. 3, 2008

(65) Prior Publication Data
US 2010/0075841 A1    Mar. 25, 2010

(30) Foreign Application Priority Data
Sep. 29, 2006  (JP) .................................. 2006-267911

(51) Int. Cl.
*B01J 23/46*  (2006.01)

(52) U.S. Cl.
USPC ........... 502/325; 502/304; 502/300; 502/349; 516/97

(58) Field of Classification Search
USPC ......................... 502/325, 324, 329
See application file for complete search history.

(56) References Cited

U.S. PATENT DOCUMENTS

| | | |
|---|---|---|
| 4,677,094 A | 6/1987 | Moser et al. |
| 4,714,538 A | 12/1987 | Moser et al. |
| 4,714,539 A | 12/1987 | Moser et al. |
| 4,714,540 A | 12/1987 | Moser et al. |
| 4,737,483 A | 4/1988 | Moser et al. |
| 4,791,087 A | 12/1988 | Moser et al. |
| 4,865,719 A | 9/1989 | Moser et al. |
| 4,923,595 A | 5/1990 | Moser et al. |
| 5,376,610 A | 12/1994 | Takahata et al. |
| 2001/0048970 A1 | 12/2001 | Hagemeyer et al. |
| 2005/0065026 A1* | 3/2005 | Okubo .................... 502/339 |
| 2005/0113614 A1 | 5/2005 | Lowe et al. |
| 2007/0060473 A1 | 3/2007 | Saito et al. |

(Continued)

FOREIGN PATENT DOCUMENTS

| | | |
|---|---|---|
| EP | 1 825 912 | 8/2007 |
| GB | 2 052 294 | 1/1981 |

(Continued)

OTHER PUBLICATIONS

International Search Report for PCT/JP2007/069415 (Dec. 6, 2007).

(Continued)

*Primary Examiner* — Melvin C Mayes
*Assistant Examiner* — Colette Nguyen
(74) *Attorney, Agent, or Firm* — Millen, White, Zelano & Branigan P.C.

(57) ABSTRACT

A rhodium-loading solution characterized by comprising rhodium atoms and an organic base in a molar ratio of 1:0.5-35.

10 Claims, 5 Drawing Sheets

(56) References Cited

U.S. PATENT DOCUMENTS

| | | | |
|---|---|---|---|
| 2007/0225159 A1* | 9/2007 | Ibe et al. | 502/304 |
| 2008/0039536 A1* | 2/2008 | Fisher et al. | 516/97 |
| 2008/0063594 A1* | 3/2008 | Armstrong et al. | 423/544 |

FOREIGN PATENT DOCUMENTS

| | | | |
|---|---|---|---|
| JP | 5-293376 A | | 11/1993 |
| JP | 2000-279818 A | | 10/2000 |
| JP | 2000-301000 | * | 10/2000 |
| JP | 2000-301000 A | | 10/2000 |
| JP | 2003-01000 | * | 10/2000 |
| JP | 2002-001119 | * | 1/2002 |
| JP | 2002-1119 A | | 1/2002 |
| JP | 2002-001119 | * | 8/2002 |
| JP | 2002-282692 A | | 10/2002 |
| JP | 2004-232299 | * | 8/2004 |
| JP | 2004-267961 A | | 9/2004 |
| JP | 2005-314739 | * | 11/2005 |
| JP | 2005-314739 A | | 11/2005 |
| JP | 2006 43654 | | 2/2006 |
| WO | WO03/037508 | * | 5/2003 |
| WO | WO-03 037508 | | 5/2003 |
| WO | WO-2005 123255 | | 12/2005 |
| WO | WO2006/057067 | * | 6/2006 |

OTHER PUBLICATIONS

Office Action for Chinese Patent Application No. 200780019865 dated Aug. 5, 2011.

Supplementary European Search Report for EP 07 82 9154 dated Sep. 5, 2011.

* cited by examiner

Rh ⊢―――⊣ 35μm

Rh ⊢────⊣ 35μm

Rh ⊢—⊣ 35μm

RHODIUM-LOADING SOLUTION AND RHODIUM CATALYST PREPARED USING THE SAME

TECHNICAL FIELD

The present invention relates to a rhodium-loading solution and to a rhodium catalyst prepared using the solution.

BACKGROUND ART

Exhaust gas purification catalysts obtained by coating noble metals such as platinum, rhodium and palladium onto carriers are used for the purpose of efficiently purifying noxious gas components, HC, CO, NOx and the like emitted from internal combustion engines. Among the noble metals used for NOx purification by reduction reaction, rhodium exhibits particularly superior heat resistance compared to platinum or palladium. It is therefore particularly suited for automobile exhaust gas purification reactions. On the other hand, since rhodium is quite expensive compared to other noble metals, its use in catalysts is usually preferred to be minimal, and for example, Japanese Unexamined Patent Publication (Kokai) No. 2002-282692 states that the loading weight of rhodium is preferably 0.1-2 g for 1 L of catalyst.

Noble metal solutions used in the prior art have had problems of low efficiency of loading with coating layers. Thus, since it has been difficult to load noble metals onto carriers in the desired amount by single dip treatment using conventional noble metal-containing solutions that have low loading efficiency, it has been necessary to carry out multiple dip treatments. Japanese Unexamined Patent Publication (Kokai) No. 2005-314739 attempts to solve this problem by loading the noble metal on the carrier at high density. However, while this publication mentions a palladium-containing solution (Example 1) and a platinum-containing solution (Example 2), there is no concrete disclosure of a solution for high-density loading of rhodium onto the carrier, and even the amounts of organic bases such as amines are not specified.

For efficient use of rhodium, it is known that the rhodium should be loaded preferentially so as to be concentrated near the surface of the wash coat layer for greater contact efficiency with the exhaust gas, and for example, Japanese Unexamined Patent Publication (Kokai) No. 2000-301000 discloses a technique for loading noble metals such as rhodium on the surface of coating layers. However, the loading method used is laborious, and the advantage of such higher-density loading is not fully realized.

DISCLOSURE OF THE INVENTION

The aforementioned methods of loading by impregnation of solutions are the common methods for loading with catalyst-loading solutions onto carrier surfaces. However, when a carrier is impregnated with a nitric acid-based rhodium solution such as used in the prior art for preparation of rhodium catalysts, the catalyst becomes uniformly loaded over not only the entire surface of the catalyst coating layer of the carrier but also to the interior, and therefore it has been difficult to localize rhodium particles at the uppermost surface of the catalyst coating layer that contacts with exhaust gas. As a result, the number of rhodium particles in the catalyst that actually take part in the exhaust gas purification reaction is reduced, and the purification performance of rhodium catalysts has therefore been inadequate for the amount of rhodium used.

The present inventors have conducted much research toward solving the problems associated with rhodium catalysts, and as a result they have found that if the amount of an organic base added to a conventional nitric acid-based rhodium-loading solution is appropriately adjusted, it is possible to obtain a solution capable of high-density loading on the coating layer of a carrier. In addition, it was found that the loading efficiency is further improved if the pH of the solution is kept constant.

In other words, the invention provides a rhodium-loading solution that facilitates high-density loading near the catalyst coating layer surfaces of carriers.

When a rhodium-loading solution of the invention is used, rhodium can be loaded so as to be concentrated near the uppermost surface, and specifically, within 20 μm of the uppermost surface of the catalyst coating layer that is in more frequent contact with exhaust gas, thus allowing more efficient use of the rhodium. The rhodium solution of the invention does not require a step of surface treatment of an inorganic oxide or its precursor, unlike the production process described in Japanese Unexamined Patent Publication (Kokai) No. 2000-301000, and can therefore more easily form a catalyst coating layer on the carrier. The rhodium particles in the rhodium catalyst can be loaded so that at least 85% of the particles can be concentrated within 20 μm from the catalyst coating layer surface. Without being bound to any particular theory, it is believed that addition of an appropriate amount of an organic base to the rhodium-loading solution of the invention allows the rhodium particles to be adsorbed in order from the acid sites on the surface of the monolith or other base material.

A rhodium catalyst produced using a rhodium-containing solution according to the invention has the rhodium concentrated near the uppermost surface of the catalyst coating layer as mentioned above, and therefore the exhaust gas purification performance is superior to that of a conventional rhodium catalyst with an equivalent content of rhodium in the catalyst coating layer.

BEST MODE FOR CARRYING OUT THE INVENTION

Figure 1:
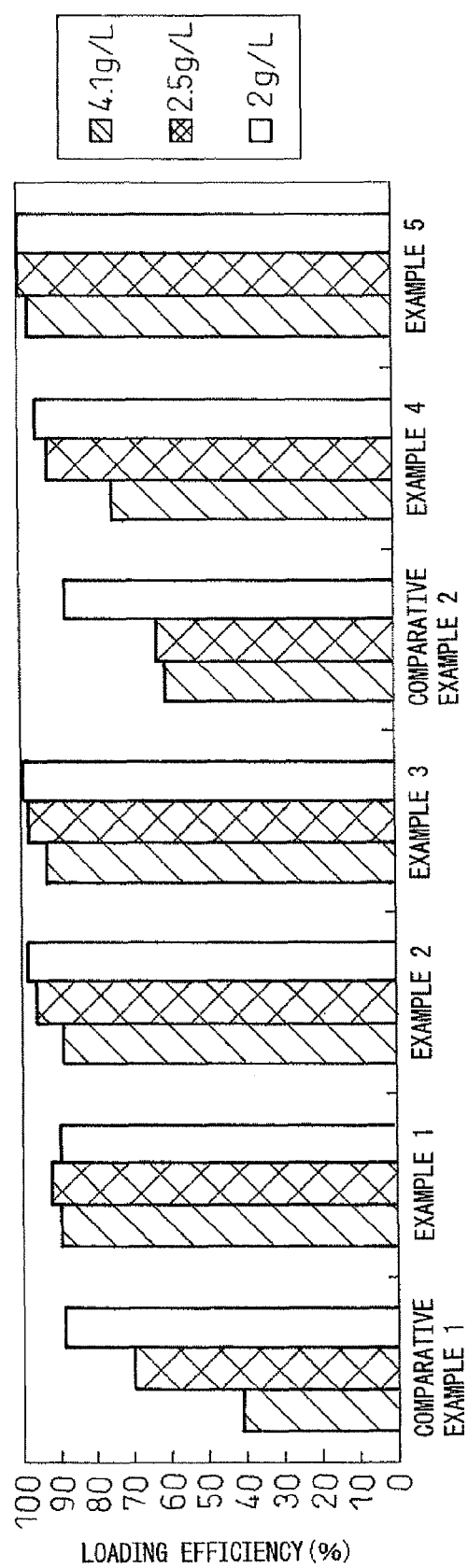
FIG. 1 is a graph showing the rhodium loading efficiency (%) values for the catalysts of Examples 1-3 and Comparative Examples 1 and 2 prepared using solutions with rhodium concentrations of 2 g, 2.5 g and 4.1 g per 1 L catalyst volume. The loading efficiency was determined by a single impregnation of the carrier with the solution followed by comparison of the rhodium concentrations of the solutions before and after loading, by atomic absorption spectrometry (AA).

According to a first aspect of the invention there is provided a rhodium-loading solution characterized by comprising rhodium atoms and an organic base in a molar ratio of 1:0.5-35.

The rhodium in the rhodium-loading solution of the invention may be obtained by, for example, dissolving rhodium in hydrochloric acid, nitric acid or the like. The rhodium-loading solution of the invention may also contain, in addition to rhodium atoms, also other noble metal components such as platinum or palladium as necessary for the purpose.

The term "organic base" as used herein refers to a base with at least one amine group, and preferably a quaternary ammonium salt of the general formula $R_1R_2R_3R_4N^+OH^-$ (where $R_1$-$R_4$ each independently represent a C1-C3 straight-chain alkyl group). Quaternary ammonium salts wherein $R_1$-$R_4$ are methyl or ethyl are preferred. Examples of organic bases include, but are not restricted to, tetramethylammonium hydroxide, trimethylethylammonium hydroxide and dimethyldiethylammonium hydroxide. Those with high boiling points are preferred, and tetramethylammonium hydroxide with a boiling point of about 100° C. is especially preferred. Tetramethylammonium hydroxide is also preferred from the standpoint of ease of handling.

The rhodium-loading solution of the invention contains the organic base in an amount at a molar ratio of 0.5-35 with respect to rhodium atoms. If the molar ratio is less than 0.5 the loading efficiency will be reduced, and if it is greater than 35 the alkalinity of the solution will be too high due to the large amount of organic base, while the loadability of the solution on the carrier will be reduced and the amount of rhodium in the solution will be undesirably lower. In order to accomplish loading of the rhodium in a manner that is concentrated near the catalyst coating layer (for example, within 20 μm of the coating layer surface), the organic base may be used at 5-35 mol and preferably 20-30 mol per atom of rhodium.

The effect of the organic base is related not only to the amount of organic base used but also to the pH of the solution itself. Specifically, as described in more detail below, the effect of the organic base increases as the pH of the solution becomes more acidified, with more rhodium being concentrated near the surface of the catalyst layer. Consequently, when the pH of the solution is controlled to an adjacent acidic region in order to load the rhodium in a manner concentrated near the catalyst coating layer, a superior surface-concentrated loading effect is exerted even if the molar ratio of the organic base is 1.5-20 mol and in some cases about 5-15 mol.

The pH of the rhodium-loading solution of the invention may be appropriately varied toward acidity or alkalinity depending on the stability of the solution or to prevent formation of precipitates. Specifically, the pH of the solution is preferably 4 or lower, or 9 or above. In order for the catalyst which is finally obtained using the solution of the invention to attain excellent purification performance at low temperature, the rhodium to be loaded is preferably concentrated as close to the surface of the catalyst coating layer as possible (for example, within 10 μm from the uppermost surface). In this case, the solution of the invention is preferably acidic, and more specifically it preferably has a pH of about 4 or less and more preferably about 3 or less. The lower limit for the pH, when the solution is acidic, may be about 1.

In order to obtain a catalyst with durability in particular, rather than purification performance, the rhodium is preferably dispersed to some extent near the surface of the catalyst coating layer. In this case, the pH of the solution of the invention is preferably alkaline, and more specifically it has a pH of at least 10 and more preferably at least 12. The upper limit for the pH may be about 14.

According to a second aspect of the invention there is provided a rhodium catalyst prepared by coating the carrier with the rhodium-loading solution.

The term "carrier" as used herein refers to alumina, zirconia, ceria or a complex oxide thereof to be coated on a base material such as a honeycomb structure, and there may be mentioned silica, titania and zeolite. The carrier may also refer to the coated honeycomb structure or other base material.

The coating may be carried out by an ordinary method used for production of catalysts, such as an impregnation method. Specifically, it may be carried out by impregnating the carrier with the rhodium-loading solution and adsorbing the rhodium particles onto the carrier surface, and then drying, firing and reducing it. The loading efficiency in an impregnation method is calculated by subtracting the rhodium concentration remaining in the rhodium-loading solution after loading from the rhodium concentration of the rhodium-loading solution before loading, using atomic absorption spectrometry (AA).

The rhodium-loading solution of the invention is loaded in such a manner that the rhodium is concentrated within 20 μm from the surface of the catalyst coating layer. This is thought to occur because adsorption of the rhodium compound initiates from the acid sites on the coating layer surface with appropriate addition of an organic base. The thickness of the loaded rhodium will vary depending on the preparation conditions of the solution.

The rhodium-loading solution of the invention can be suitably used as an exhaust gas purification catalyst, since the rhodium can be loaded in a manner concentrated at the catalyst coating layer surface, which corresponds to the contact surface with exhaust gas. However, its applications are not limited to an exhaust gas purification catalyst, and may include any catalysts that require highly efficient loading of rhodium on the carrier surface.

The present invention will now be explained in greater detail by the following examples. However, it is to be understood that the invention is not limited to these examples.

EXAMPLES

Example 1

A rhodium nitrate solution containing 50 g of rhodium per 1 L was prepared. Tetramethylammonium hydroxide was added as an organic base to the solution through a tube pump set to a dropping rate of 20 ml/min, to prepare a rhodium-loading solution with rhodium atoms and tetramethylammonium hydroxide in a molar mixing ratio of 1:10 (rhodium: tetramethylammonium hydroxide). Upon completion of the addition, stirring was performed for at least 30 minutes. The measured value for the pH of the solution was in the range of about 13-14.

Then, using the rhodium loading solution, the rhodium was loaded onto the carrier by a conventional impregnation method. The carrier was a monolith base material composed of cordierite, wash coated with a mixture of oxides comprising alumina, zirconia and lanthanum. After impregnating the carrier with the rhodium-loading solution, it was subjected to drying, firing and reduction steps to obtain a rhodium-supporting catalyst.

Example 2

A rhodium-loading solution was prepared by the same method as Example 1, except that the rhodium and tetramethylammonium hydroxide mixing ratio was a molar ratio of 1:20. The measured value for the pH of the solution was in the range of about 13-14.

Example 3

A rhodium-loading solution was prepared by the same method as Example 1, except that the rhodium and tetramethylammonium hydroxide mixing ratio was a molar ratio of 1:30. The measured value for the pH of the solution was in the range of about 13-14.

Example 4

A rhodium-loading solution was prepared by the same method as in Example 1, except that the rhodium and tetramethylammonium hydroxide mixing ratio was a molar ratio of 1:1.5. The measured value for the pH of the solution was about 2.

Example 5

A rhodium-loading solution was prepared with a rhodium atom and tetramethylammonium hydroxide molar mixing ratio of 1:10 (rhodium:tetramethylammonium hydroxide) by the same method as Example 1, except that 8.5 mol of nitric acid was added per mole of rhodium. The measured value for the pH of the solution was about 2.

Comparative Example 1

A rhodium-loading solution was prepared by the same method as in Example 1, except that the rhodium and tetramethylammonium hydroxide mixing ratio was a molar ratio of 1:40. The measured value for the pH of the solution was greater than 14.

Comparative Example 2

As a control, a rhodium nitrate solution prepared according to the procedure described in Example 1 was used as a rhodium-loading solution containing no organic base. The measured value for the pH of the solution was about 0.5.

(Measurement of Loading Efficiency of Rhodium Solution on Carrier)

It was confirmed that the rhodium-loading solutions of Examples 1-5 obtained in the manner described above, not only at low concentration but also at high concentration, were more efficiently loaded onto the carriers by a single dip treatment compared to the conventional rhodium-loading solutions (Comparative Examples 1 and 2).

First, the solutions of Examples 1-5 and Comparative Example 1 and 2 were diluted with purified water, and prepared to concentrations of 2 g, 2.5 g and 4 g per 1 L volume of the supporting carrier. Next, a monolith base material composed of cordierite, wash coated with a mixture of oxides comprising alumina, zirconia and lanthanum and the like, was used as the carrier for impregnation with the solutions to accomplish loading of the rhodium. The impregnation-loaded carriers were dried, fired and reduced to obtain rhodium-supporting catalysts. The loading efficiency of rhodium in each solution was calculated by measuring the rhodium concentration in the rhodium solution before and after impregnation of the carrier by absorption spectrophotometry (AA) (Hitachi Z-5310), according to the following formula:

[(Rhodium concentration of rhodium solution before loading)(concentration ($a$))−(rhodium concentration of rhodium solution after loading)(concentration ($b$))]÷$a$×100

The results for the loading efficiency are shown in FIG. 1. All of the catalysts had high loading density of rhodium on the carrier with a low rhodium concentration of 2 g/L, but with increasing concentration the rhodium loading efficiency of the catalysts prepared using the solutions of Comparative Examples 1 and 2 was reduced by about 30-40%, and was notably reduced by about 60% with a concentration of 4.1 g/L in Comparative Example 1, compared to the efficiency with 2 g/L. The catalysts prepared using the solutions of Examples 1-5 had substantially no reduction in loading efficiency even with a high rhodium concentration of 4.1 g/L. Among the examples, the loading efficiency with the solutions of Examples 2, 3 and 5 were high at all concentrations, demonstrating that the increased amount of organic base contributed to improved loading efficiency. These results indicated that the rhodium-loading solutions of Examples 1-5 allowed rhodium to be loaded onto carriers at higher efficiency than conventional catalysts, even at high concentrations.

Figure 2:
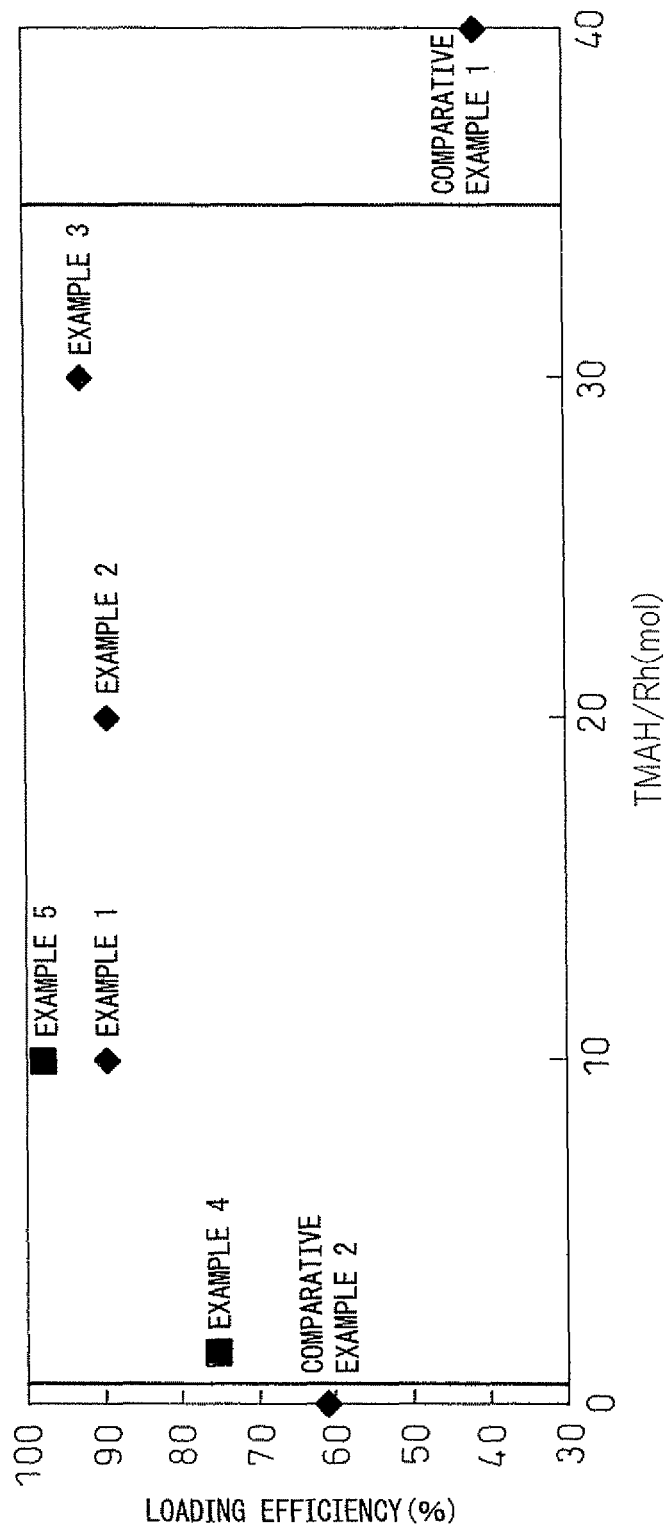
FIG. 2 is a graph showing the relationship between loading efficiency and molar ratio of tetramethylammonium hydroxide (TMAH)/rhodium, with the solution containing 4.1 g/L rhodium in FIG. 1.

FIG. 2 shows the relationship between loading efficiency and organic base/rhodium molar ratio, when using the 4.1 g rhodium/L solution of FIG. 1. According to FIG. 2, a fixed relationship exists between the range for the organic base/rhodium molar ratio used for the invention and the rhodium loading efficiency. Specifically, satisfactory loading efficiency was achieved when the organic base was present at a molar ratio of 0.5-35 with respect to rhodium atoms (Examples 1-5). On the other hand, if the organic base/rhodium molar ratio is less than 0.5 as in the comparative examples, the loading efficiency is significantly reduced. If the molar ratio is greater than 35, the loading efficiency is even more notably reduced. This suggests that, since the rhodium concentration in the solution is relatively lower for increasing amounts of organic base, a large amount of organic base is necessary to prepare a rhodium-loading solution with a high concentration of 4.1 g rhodium/L, and the presence of the large amount of organic base adversely affects loading of the rhodium.

(Measurement of Purification Performance)

The effect of the solution of the invention on catalyst performance was investigated. The solutions of Examples 2 and 5 and Comparative Example 2 were used to prepare monolithic catalysts with rhodium concentrations of 0.75 g/L of carrier volume, by the same method used for the catalysts described above.

Figure 3:
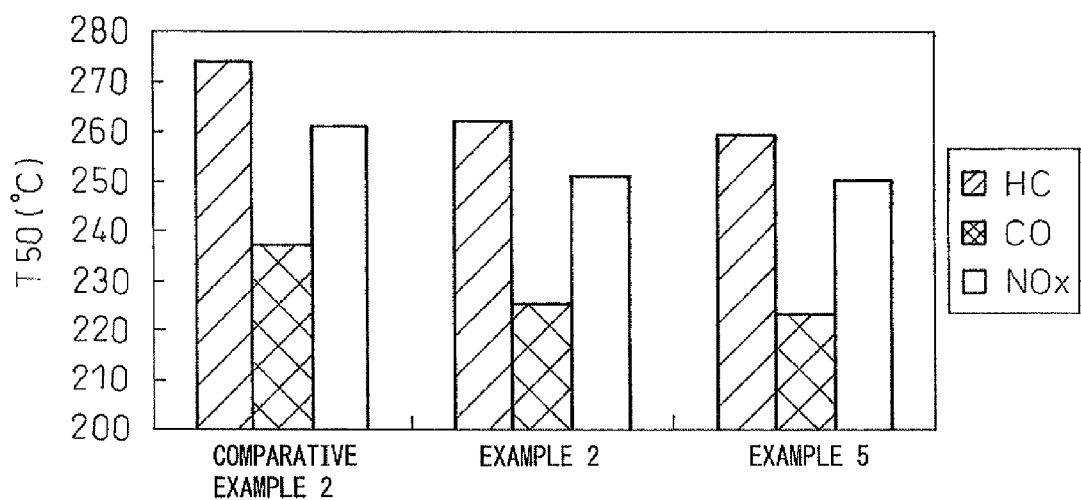
FIG. 3 is a bar graph showing a comparison of purification performance for the catalysts of Comparative Example 2 and Example 2.

After subjecting the catalyst to an endurance test under air atmosphere at 1000° C. for 10 hours, it was placed in an ordinary pressure fixed bed circulating reactor, and a stoichiometric amount of gas was circulated through the catalyst while increasing the temperature from 100 to 350° C. at a rate of 10° C./min, during which time the temperature at which 50% purification of HC, CO and NOx was reached (50% purification rate (T50)) was continuously measured. The analyzer in the apparatus was a MEXA-7100 by HORIBA, and special devices were used for the gas mixer and reactor. The measurement results are shown in FIG. 3. A lower T50 corresponds to a lower activation temperature, that is, catalytic activity is also high.

Based on the results shown in FIG. 3, the rhodium-supporting catalysts prepared using solutions according to the invention (Examples 2 and 5) clearly had lower T50 values and exhibited more satisfactory purification performance for each gas, compared to the catalyst prepared using a rhodium-loading solution without an added organic base (Comparative Example 2).

(Measurement of Rhodium Loading Distribution)

The correlation between the purification performance measured above and the rhodium loading distribution was investigated next. Each of the catalysts of Comparative Example 2 and Examples 2 and 5 was cut into circular sections at 1 cm intervals in the direction vertical to the gas flow, and the rhodium loading distribution at the cut surface was analyzed using an electron probe microanalyzer (EPMA) (EPMA-1600 by Shimadzu Corp.). The results are shown in FIG. 4 (Comparative Example 2), FIG. 5 (Example 2) and FIG. 6 (Example 5).

Figure 4:
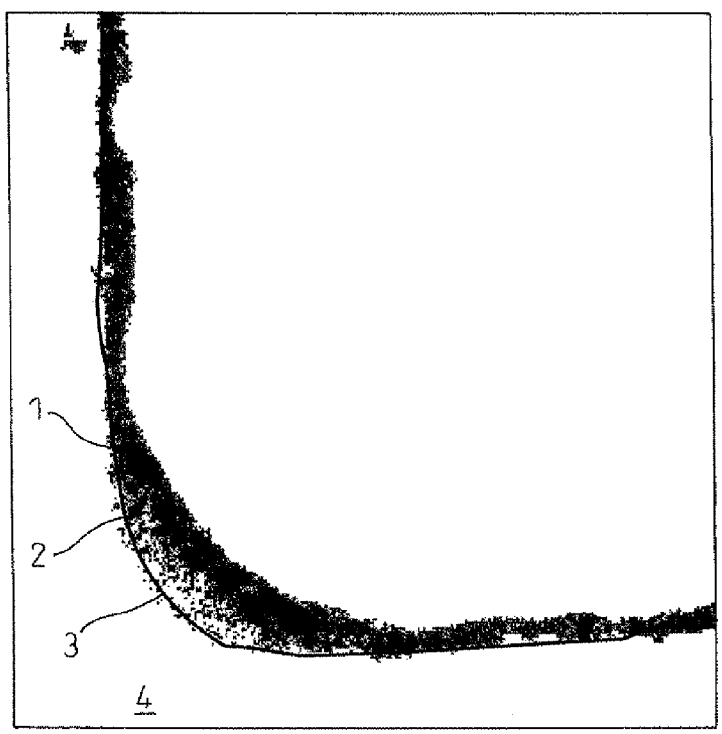
FIG. 4 shows EPMA data for rhodium loading distribution in the catalyst of Comparative Example 2 prepared by dipping in a rhodium-loading solution with a concentration of 0.75 g/L.
Figure 5:
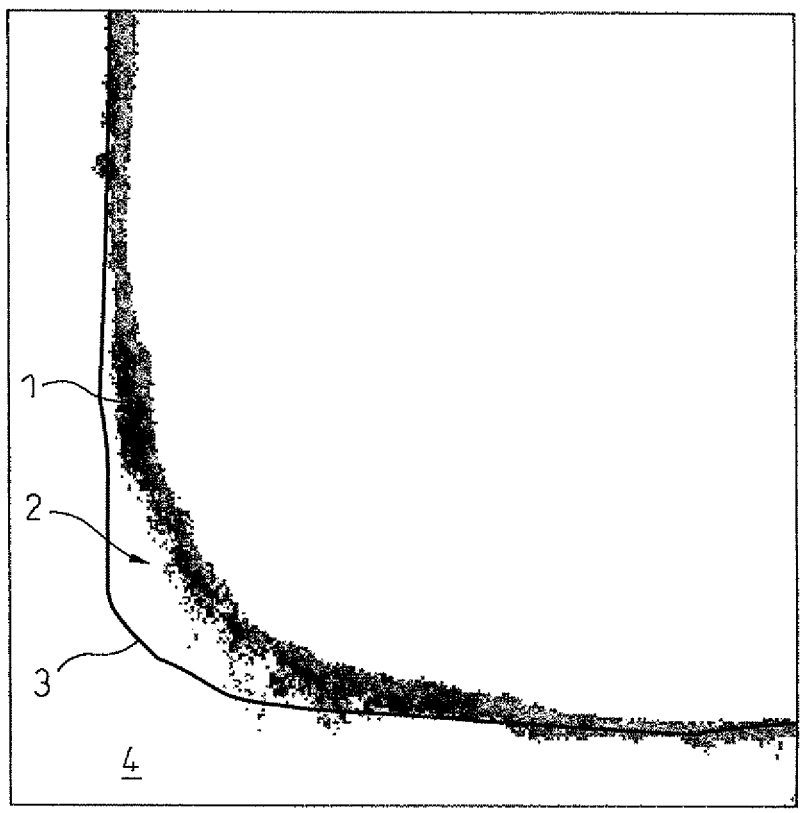
FIG. 5 shows EPMA data for rhodium loading distribution in the catalyst of Example 2 prepared by dipping in a rhodium-loading solution with a concentration of 0.75 g/L.
Figure 6:
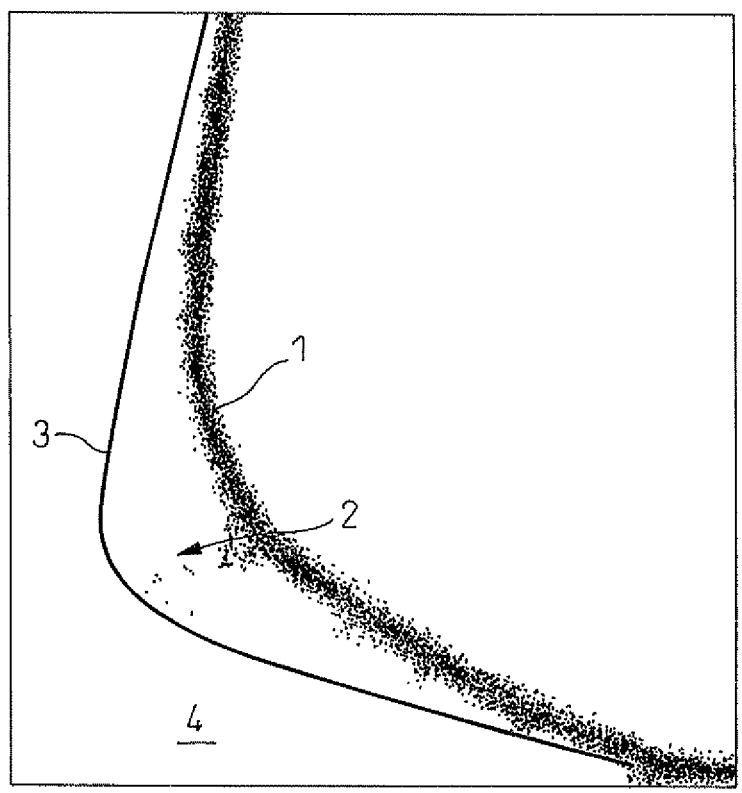
FIG. 6 shows EPMA data for rhodium loading distribution in the catalyst of Example 5 prepared by dipping in a rhodium-loading solution with a concentration of 0.75 g/L.

In FIGS. 4 to 6, the border between the catalyst coating layer 2 and base material layer 4 (the base material edge 3) has been identified by a thick line. The rhodium 1 is indicated by colored dots, and the base material layer 4 is present in the form of an L to the left of the base material edge 3. When FIG. 4, FIG. 5 and FIG. 6 are compared, it is seen that the rhodium 1 of Comparative Example 2 is uniformly loaded across the entirety and penetrating through to the interior of the catalyst coating layer 2, whereas in the catalysts of Examples 2 and 5, the rhodium 1 is concentrated at the surface of the catalyst coating layer 2. The results of quantitation by EPMA revealed that the catalysts of Examples 2 and 5 had over 85% of the rhodium 1 present within 20 μm from the surface of the catalyst coating layer 2.

INDUSTRIAL APPLICABILITY

The results described above demonstrate that the catalysts of Examples 2 and 5 exhibited enhanced exhaust gas purification performance compared to the catalyst of Comparative Example 2, since the rhodium was loaded on the catalyst in a manner concentrated at the sections in contact with exhaust gas. The rhodium-loading solution of the invention therefore allows production of a catalyst with excellent purification performance through a reduced number of steps for impregnation loading.

What is claimed is:

1. A rhodium-loading solution comprising dissolved rhodium atoms and an organic base in a molar ratio of 1:0.5-35, wherein the pH of the solution is no greater than 4.

2. A rhodium-loading solution according to claim 1, wherein the organic base has an amine group.

3. A rhodium-loading solution according to claim 1, wherein the organic base is tetramethylammonium hydroxide.

4. A rhodium-loading solution according to claim 1, wherein the pH is no greater than 3.

5. A rhodium catalyst prepared by coating a carrier with a rhodium-loading solution according to claim 1.

6. A rhodium catalyst according to claim 5, wherein at least 85% of the rhodium is present within 20 μm from the catalyst coating layer surface of the carrier.

7. A rhodium-loading solution according to claim 1, wherein the solution further comprises hydrochloric or nitric acid.

8. A rhodium-loading solution according to claim 1, wherein the solution further comprises nitric acid.

9. A rhodium-loading solution according to claim 1, wherein the organic base is a quaternary ammonium salt of the formula $R_1R_2R_3R_4N^+OH^-$, where $R_1$-$R_4$ each independently represent a $C_1$-$C_3$ straight-chain alkyl group.

10. A rhodium-loading solution according to claim 1, wherein the molar ratio of the rhodium atoms to organic base is 1:1.5-20.

* * * * *